(12) United States Patent
Siddarth et al.

(10) Patent No.: US 11,445,083 B1
(45) Date of Patent: Sep. 13, 2022

(54) METHODS AND SYSTEMS FOR HANDLING MULTIPLE URLS GENERATED UPON SCANNING MULTIPLE DOCUMENTS TO ONE OR MORE CLOUD LOCATIONS

(71) Applicant: XEROX CORPORATION, Norwalk, CT (US)

(72) Inventors: Jaya Siddarth, Chennai India (IN); Sandhyakiran Giri, Chennai India (IN); Saranya Bharathi, Chennai India (IN); Sowjanya Mahendran, Madurai India (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/198,428

(22) Filed: Mar. 11, 2021

(51) Int. Cl.
| | |
|---|---|
| *H04N 1/00* | (2006.01) |
| *H04N 1/21* | (2006.01) |
| *H04L 67/146* | (2022.01) |
| *H04L 67/1097* | (2022.01) |
| *H04N 1/04* | (2006.01) |
| *G06F 40/279* | (2020.01) |

(52) U.S. Cl.
CPC ......... *H04N 1/2183* (2013.01); *G06F 40/279* (2020.01); *H04L 67/1097* (2013.01); *H04L 67/146* (2013.01); *H04N 1/00244* (2013.01); *H04N 1/00411* (2013.01); *H04N 1/04* (2013.01)

(58) Field of Classification Search
CPC ............. H04N 1/0009; H04N 1/00209; H04N 1/00244; H04N 1/00411; H04N 1/04; H04N 1/2166; H04N 1/2183; H04N 2201/0094; H04N 2201/3288; G06F 40/279; H04L 67/1097; H04L 67/146
USPC ............................... 358/1.15, 1.16, 403, 474
See application file for complete search history.

(56) References Cited

U.S. PATENT DOCUMENTS

| | | | | |
|---|---|---|---|---|
| 2014/0344663 | A1* | 11/2014 | Joel ......................... | H04L 67/02 715/234 |
| 2014/0365863 | A1* | 12/2014 | Ingole ................ | G06F 16/9574 715/234 |
| 2021/0105372 | A1* | 4/2021 | Diasti ................ | H04L 67/1097 |
| 2021/0409554 | A1* | 12/2021 | Ito ...................... | H04N 1/00209 |

* cited by examiner

*Primary Examiner* — Kent Yip

(57) ABSTRACT

The present disclosure discloses methods and systems for handling multiple URLs generated or obtained upon scanning multiple documents to one or more cloud locations. The one or more cloud locations may be different or may be the same. The method includes receiving multiple URLs generated for multiple scanned documents stored at the one or more cloud locations. Upon receiving, each URL is analyzed to identify a keyword relevant for each URL. Based on the identified keywords, a new single URL is created to access multiple scanned documents placed at the one or more cloud locations. The new single URL is created such that the new single URL when accessed by the user allows the user to access multiple scanned documents at the same time without needing the user to access multiple URLs. This way, the user can access multiple scanned documents through a single URL i.e., the new single URL.

18 Claims, 9 Drawing Sheets

METHODS AND SYSTEMS FOR HANDLING MULTIPLE URLS GENERATED UPON SCANNING MULTIPLE DOCUMENTS TO ONE OR MORE CLOUD LOCATIONS

TECHNICAL FIELD

The present disclosure relates to the field of scanning to cloud. More specifically, the disclosure relates to methods and systems for handling multiple URLs generated upon scanning multiple documents to one or more cloud locations.

BACKGROUND

Multi-function devices have become quite common and essential in our day-to-day life, offering various functionalities such as printing, photocopying, faxing, scanning, etc. Lately, the multi-function devices have started facilitating scan to cloud functionality, which allows users to scan their documents and store the scanned documents directly on cloud servers such as Google Drive™, Amazon Drive™, Dropbox™, OneDrive™, etc. To facilitate such functionality, the multi-function devices are integrated with various third-party cloud service providers/cloud servers.

In order to scan a document to a cloud location, the user is required to select a desired location on a cloud server. The user can select the desired location by simply selecting the desired location/folder or sub-folder on the cloud server. Once the location is selected and the document is submitted at the multi-function device for scanning, the scanned document is sent to the cloud server which then stores the scanned document at the selected location. The cloud server further creates a link/URL (Uniform Resource Locator) to access or retrieve the scanned document later as and when required. The user can simply access the created URL and access the stored document. The user can share the created URL with other users to access the scanned document stored therein.

There can be scenarios when the user wants to scan multiple documents to one or more different cloud locations and share them with one or more other users. In such scenarios, multiple URLs are created, where each URL corresponds to a different document. To access the scanned documents at later stages, the user is required to access all URLs separately and then perform an action such as printing, reading, viewing, etc. For example, if 5 scanned documents are stored at one or more different cloud locations, the user is required to manually access five different URLs, each time when he wishes to access these scanned documents. Accessing multiple URLs could be frustrating, and tedious for users and becomes unmanageable at times. Moreover, if the user wants to share all the scanned documents with other users, then the user is required to share all URLs with them. To do this, the user is required to first collect all the URLs, individually email the URLs to the one or more other users and this could be very frustrating and time consuming for the user. In this light, there is a need for improved methods and systems to handle multiple URLs generated or obtained upon scanning documents.

SUMMARY

According to aspects illustrated herein, there is a method for handling multiple Uniform Resource Locators (URLs) generated upon scanning multiple documents to one or more cloud locations, where the method is performed at a multi-function device. The method includes receiving a selection of a scan to cloud option, wherein the scan to cloud option is selected by a user via a user interface. Once selected, multiple documents are received for scanning. Upon scanning, multiple scanned documents are generated, wherein each scanned document is generated corresponding to a document input for scanning. Thereafter, a selection of a cloud location for storing each scanned document is received. Then, a URL for each scanned document is obtained, wherein the URL allows the user to access respective scanned document from the cloud location. Once obtained, the URL obtained for each scanned document is automatically stored. Based on the URL obtained for each scanned document, a new single URL is created to access the multiple scanned documents at the same time, without requiring the user to access multiple URLs.

According to further aspects illustrated herein, a multi-function device for handling multiple URLs generated upon scanning multiple documents to one or more cloud location, is disclosed. The multi-function device includes a user interface to receive a selection of a scan to cloud option and to receive a selection of a cloud location for storing each scanned document. The multi-function device includes an automatic document handler to receive multiple documents for scanning. Further, the multi-function device includes a scanner to generate scanned documents, wherein each scanned document is generated corresponding to a document input for scanning. The multi-function device further includes a URL manager to obtain a URL for each scanned document, wherein the URL allows the user to access the scanned document from the corresponding cloud location. The URL manger automatically stores the URL obtained for each scanned document and based on the URL obtained for each scanned document, a new single URL is created to access the multiple scanned documents together at a single location, without requiring the user to access multiple URLs to access multiple scanned documents.

According to furthermore aspects illustrated herein, a scan to cloud application running on a device to handle multiple URLs (Uniform Resource Locators) is disclosed. The scan to cloud application is for: receiving multiple URLs obtained for multiple scanned documents stored at one or more different cloud locations, wherein each URL corresponds to a scanned document; analyzing each URL to identify a keyword relevant for each URL; and based on the identified keywords, generating a new single URL to access multiple scanned documents placed at the one or more different cloud locations, without requiring the user to access multiple URLs to access multiple scanned documents.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, scanning, copying, imaging or the like. The multi-function device may include software, hardware, firmware, or a combination thereof. In the context of the current disclosure, the multi-function device handles multiple URLs obtained upon scanning multiple documents to one or more cloud locations. Specifically, the multi-function device creates a new single URL such that all scanned documents stored at the one or more cloud locations can be accessed without requiring a user to access multiple URLs for accessing multiple scanned documents. This way, the multi-function device provides a way to the user to access multiple scanned documents stored at the one or more cloud locations through a single URL such as the new single URL as created.

The term "scanned document" is an output file generated upon scanning a document. The scanned document can be in a virtual or software form (embodied in a software file). The virtual form can also be referred to as digital form, electronic version or the like. The scanned document may include content in the form of text, image, graphics or a combination thereof. The term "document" submitted/input for scanning represents in a physical form, such as printed on paper.

The term "scan to cloud" refers to a feature of storing scanned documents at one or more cloud storage hosted by one or more cloud servers. The cloud servers automatically generate URLs when the scanned documents are stored.

The term "keyword" refers to an identifier assigned to an individual URL for identifying the corresponding documents/scanned documents. The keyword can be derived from the name of the document associated with the URL. For instance, if "https://www.sharepoint.com/user/D1" is the URL generated/obtained for a scanned document, then "D1", may be the keyword assigned for identifying the URL/scanned document/document.

The term "new single URL" refers to a single URL created to access multiple scanned documents stored at one or more cloud server locations. The new single URL is created based on processing of multiple URLs as generated or obtained from the cloud servers. The cloud server locations may be different, same, or a combination thereof. The new single URL includes multiple URLs as obtained for each scanned document, where each URL is represented in the form of a keyword. The new single URL when accessed by the user or other users, automatically accesses multiple URLs at the back end and retrieves multiple scanned documents from respective cloud locations to a new cloud location. The user can access all scanned documents in a single go and can take a required action. For example, the user can print, view, read, edit, share all scanned documents through the single URL.

Overview

The present disclosure discloses methods and systems for handling multiple URLs (Uniform Resource Locators) obtained/generated upon scanning multiple documents to one or more desired cloud locations. The one or more cloud locations may be different, may be same, or a combination thereof. The methods and systems combine multiple URLs as obtained to create a new single URL. The new single URL is created such that the new single URL when accessed by the user automatically retrieves all scanned documents from respective cloud locations and displays all the scanned documents together at the same time to the user. This way, the user can access all scanned documents at the same time in a single go without requiring him to manually access any URL to access the scanned documents. The scanned documents are retrieved and stored at a new temporary cloud location. The new temporary cloud location may be a private cloud location or a public cloud location. The private cloud location can be accessed by the user using his login credentials such as username, password, user id, employee id, employee code, etc. or a combination thereof. While the public cloud location can be accessed by any user without requiring any login credentials. For example, if the user wishes to share cloud location URL with other users to access the scanned documents, the new temporary cloud location may be a common public based cloud location. The user can perform a required action such as printing, reading, viewing, editing, downloading, etc. Once the action is performed, the documents placed at the temporary location may be deleted. This way, the user can access all the scanned documents stored at one or more different cloud locations at the same time, without requiring him to manually access multiple URLs. This way, the present disclosure offers a user friendly and a more convenient way to access multiple scanned documents.

Exemplary Environment

FIG. 1 shows an exemplary environment 100 in which various embodiments of the disclosure can be practiced. The environment 100 includes a multi-function device 102 which is communicatively coupled to one or more third-party cloud servers (not shown) through a communication network. Various examples of the third-party cloud servers hosting cloud storages include such as Google Drive™, Amazon Drive™, Dropbox™, OneDrive™, etc. Various examples of the multi-function device 102 may be, a scanner, a multi-function printer, a multi-function peripheral device, or any device with scan to cloud functionalities. The multi-function device 102 provides one or more functionalities such as printing, scanning, imaging, copying, or the like. In context of the present disclosure, the multi-function device 102 facilitates scan to cloud functionality, more specifically, the multi-function device 102 manages multiple Uniform Resource Locators (URLs) obtained upon scanning multiple documents to various cloud locations.

In operation, a user selects scan to cloud option, wherein selecting the scan to cloud option allows the user to store the scanned documents at cloud storage. Once selected, the user further selects one or more required storage locations to store scanned documents. Or the user can input the required cloud locations where he wishes to store the required documents after scanning. Once the required cloud locations, are selected, the user then submits multiple documents for scanning at the multi-function device 102. The multi-function device 102 scans multiple documents and generates scanned documents corresponding to each document input for scanning. The multi-function device 102 then sends the scanned documents to respective third-party cloud service providers for storage. The respective third-party cloud service providers then generate a URL corresponding to each scanned document received from the multi-function device 102. The multi-function device 102 automatically records or stores all URLs generated by the third-party cloud servers. This way, the multi-function device 102 obtains multiple URLs. Once obtained, the multi-function device 102 processes multiple URLs to create a new single URL. The new single URL is created such that the new single URL when accessed/opened by the user facilitates access to all scanned documents to the user at a single location at the same time. This way, the user can access all scanned documents stored at multiple and/or different cloud locations without requiring him to manually access each URL or multiple URLs. The new single URL can be shared with one or more other users. The multi-function device 102 provides a way to access multiple scanned documents stored at multiple or different cloud locations using a single URL.

The multi-function device 102 automatically stores all URLs in a cloud server hosted by the multi-function device 102, also referred to as multi-function device cloud server. One example is discussed for the sake of clarity. For example, the user has three documents such as document 1, document 2 and document 3. The user scans the documents through the multi-function device 102 and three scanned documents are generated named as D1, D2 and D3. Based on the user selected location, the scanned document D1 is stored at "SharePoint$^{Tm}$", accordingly corresponding URL obtained for the scanned document is "https://www.sharepoint.com/user/D1", where "https://www.sharepoint.com/" represents specific cloud service provider, user in the URL represents a folder in the SharePoint cloud storage and D1 represents the document name Similarly, the scanned document D2 is stored in the Dropbox™ cloud storage space and accordingly the URL obtained for the scanned document D2 is, "https://www.dropbox.com/user/D2". Similarly, the scanned document D3 is stored in thecloud storage Google Drive™ and the URL obtained for the third scanned document is: "https://www.googledrive.com/user/D3". The multi-function device 102 processes these 3 URLs as obtained from respective cloud service providers, and creates a new single URL such as https://www.dropdo.com/D1/D2/D3, where https://www.dropdo.com represents a new cloud location and D1 represents the first scanned document, D2 represents the scanned document and D3 represents the third scanned document. When the user accesses the new single URL, all three scanned documents can be accessed at the same time.

The new single URL when accessed by the user using the multi-function device 102, the multi-function device 102 automatically accesses each cloud location associated with the URLs to retrieve respective scanned document from the respective cloud locations and stores the retrieved scanned documents to a new cloud location. The new cloud location may be private, or public. Once all scanned documents are stored at the new cloud location, the user can take a required action such as print, edit, view, download, etc. In addition, the user can share the new single URL with other users.

Exemplary System

Figure 2:
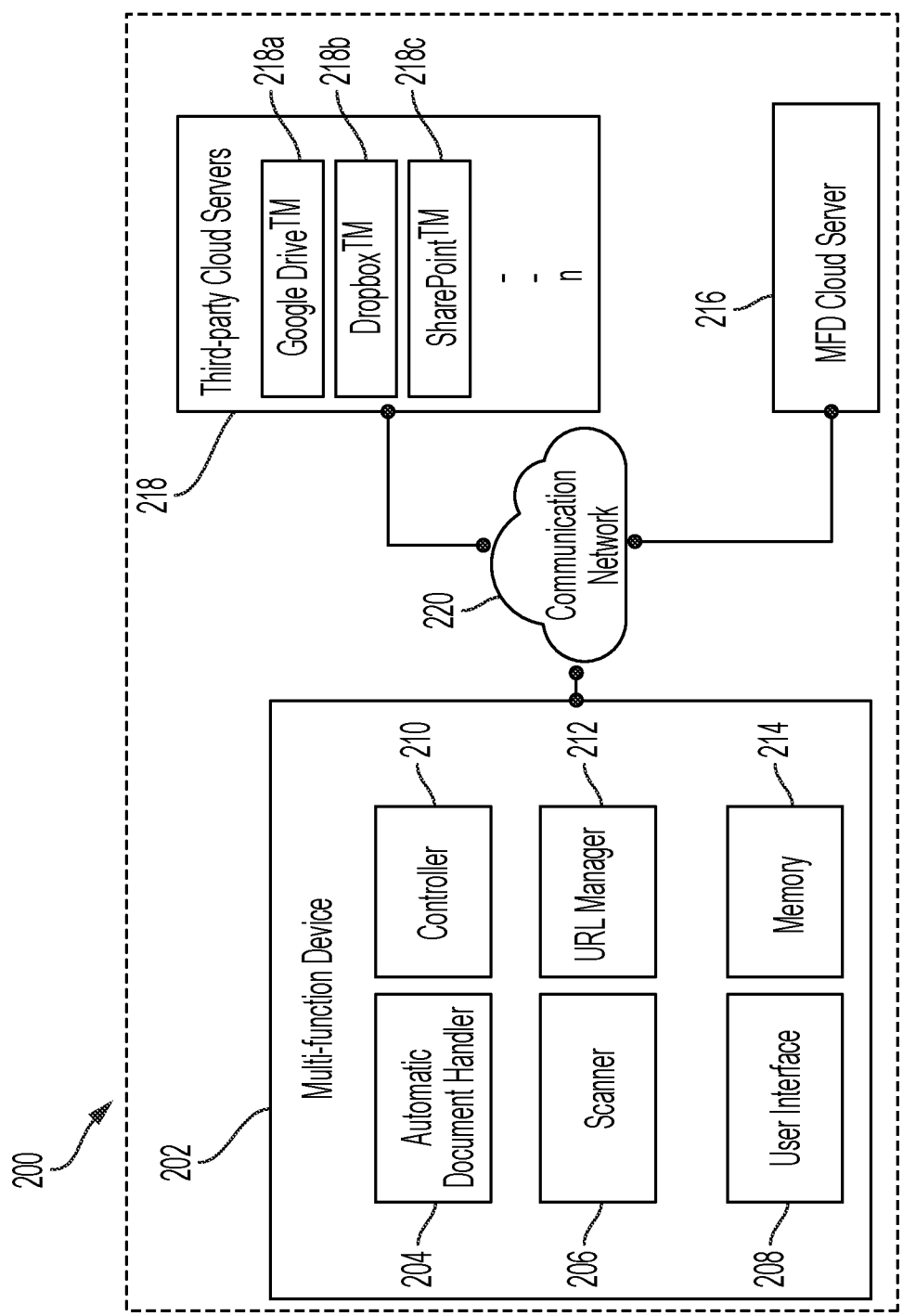
FIG. 2 is a block diagram illustrating various system components of a system, in accordance with an embodiment of the present disclosure.

FIG. 2 is a system 200 including a multi-function device (MFD) 202, a multi-function device cloud server 216, and one or more third-party cloud servers 218 for implementing the current disclosure. As illustrated, the multi-function device 202 includes an automatic document handler 204, a scanner 206, a user interface 208, a controller 210, a URL manager 212, and a memory 214. The components 204-214 are connected to each other via a conventional bus or a later developed protocol. And the components 204-214 communicate with each other for performing various functions of the present disclosure. The multi-function device 202 may further include additional component(s) as required to implement the present disclosure. The multi-function device 202 may perform functions and operations like the multi-function device 102 of FIG. 1. As shown, the multi-function device 202 is communicatively coupled to the MFD cloud server 216 via a communication network 220 for implementing the present disclosure. The MFD cloud server 216 hosts a cloud storage that can be a public cloud storage or a private cloud storage without deviating the scope of the disclosure. The multi-function device 202 is communicatively coupled to the third-party cloud servers 218 hosting various cloud storages such as Google Drive™ 218a, Dropbox™ 218b, or OneDrive™ 218c. The cloud storage can be provided by various third-party service providers such as Google, Microsoft or various other service providers.

In operation, a user wishes to scan multiple documents to one or more cloud locations in the third-party cloud servers 218. The user accesses the multi-function device 202, specifically, the user interface 208 of the multi-function device 202. The user interface 208 displays various options such as scan to email, scan to USB, scan to cloud or the like. In context of the current disclosure, the user selects the scan to cloud option. Upon selection of the scan to cloud option, the user further selects a desired cloud location from various third-party cloud storages such as Google Drive™ 218a, Dropbox™ 218b, SharePoint™ 218c (collectively 218). The user can input a cloud URL where he wishes to store respective document after scanning. The user initiates scanning of multiple documents either by selecting scan option provided on the user interface 208 or otherwise scan button provided on the multi-function device 202. The user can submit multiple documents one by one by placing the documents on a platen or on the automatic document handler 204. Alternatively, the user can submit multiple documents in one go by placing a pre-defined separator such a blank page to separate one document from the other document.

Upon submission, the scanner 206 scans multiple documents and generates multiple scanned documents. The scanned document is generated corresponding to each document submitted for scanning. Once the scanned documents are generated, the controller 210 communicates with the user selected third-party cloud servers 218 to store the scanned documents at the user selected cloud locations. Then, the third-party cloud servers 218 generate a URL for each scanned document share the URLs with the controller 210. For example, if user scans 2 documents, 2 scanned documents are generated, and 2 URLs are generated by third party cloud servers 218. For example, if the user selects first document to be stored at googleDrive™ 218a, then google cloud server generates a URL for the first scanned document. Similarly, if the user selects the second document to be stored at SharePoint™ 218c, then Microsoft cloud server generates a second URL for the second scanned document. The controller 210 obtains all the URLs automatically or otherwise from various third-party cloud servers 218. In case of automatic, the controller 210 initiates recording of the entire session from the beginning when the user initiates scanning of multiple documents till the URLs are generated for multiple scanned documents. This way, the controller 210 automatically obtains multiple URLs corresponding to multiple scanned documents. The controller 210 then stores all URLs as generated in the memory 214 of the multi-function device 202. The controller 210 may store these URLs temporarily in the memory 214. Alternatively, the controller 210 may store multiple URLS as obtained in a temporary location in the MFD cloud server 216.

In detail, in order to scan multiple documents to one or more cloud locations, the user firstly submits the first document for scanning and upon submission or before submission, the user selects a desired storage location in the third-party cloud servers 218 for storing scanned document corresponding to the first document. Thereafter, the scanner 206 scans the first document and generates the first scanned document. Once generated, the controller 210 communicates with the user selected cloud server 218 to store the first scanned document in the user selected location over user selected third-party cloud server 218. For example, the user selects a storage location in the Google Drive™ 218a to store a scanned document D1, then the controller 210 communicates with the Google Drive™ 218a to store the scanned document D1 in the Google Drive™ 218a. Then, the user selected third-party cloud server, say 218a, generates a first URL for the first scanned document and shares the first URL with the controller 210. This way, the controller 210 obtains the first URL and once obtained, the controller 210 temporarily stores the first URL in the MFD cloud server 216.

Once the first document is scanned and stored, the user submits the remaining documents one by one for scanning and selects a desired storage location for each scanned document. Similar to the first document, the scanner 206 scans the remaining documents one after another and the controller 210 communicates with the corresponding third-party cloud servers 218 for storing each scanned document based on the user selection. Then, the third-party cloud server 218 generates a URL corresponding to each scanned document and shares the same with the controller 210. This way, the controller 210 obtains all the URLs and once obtained, the controller 210 temporarily stores all the URLs in the MFD cloud server 216 along with the first URL. Once all URLs corresponding to the scanned documents are obtained, the controller 210 sends all the obtained URLs to the URL manager 212 for further processing.

The URL manager 212 analyzes each URL and identifies a keyword associated with each URL. The identified keyword for each URL helps identifying the URL and/or the scanned document. The URL manager 212 then assigns the identified keywords to all the URLs. The keyword can be derived from the name of the document associated with the URL. For instance, if "https://www.sharepoint.com/user/D1" is the URL corresponding to a scanned document, then the URL manager 212 assigns the identified keyword for each URL. The identified keyword may be directly obtained from the URL. Alternatively, the user may provide the keyword for each URL. This way, the URL manager 212 assigns the keyword to each URL, where the keyword helps identify the URL and/or the scanned document.

After assigning the keywords to all URLs, the URL manager 212 creates a new single URL. The new single URL includes a new cloud location and the keywords identified for each URL. The URL manager 212 hyperlinks each keyword to the original URL. The new single URL is created such that the new single URL when accessed by the user allows the user to access all scanned documents at the same time. For example, if the new single URL is https://www.dropdo.com/sales/D1/D2/D3, then https://www-.dropdo.com/sales represents the new cloud location i.e., the MFD cloud server 216, and "sales" represents a folder in the MFD cloud server 216, and D1, D2 and D3 are hyperlinked to the original URLs. In detail, D1 is hyperlinked to https://www.sharepoint.com/user/D1, D2 is further hyperlinked to https://www.dropbox.com/user/D2 and D3 is hyperlinked to https://www.googledrive.com/user/D3. According to the conventional approach, the user is required to access 3 different URLs to access 3 different scanned documents. But in context of the of the current disclosure, the user is required to access a single URL i.e., new single URL and can easily access all 3 different scanned documents.

Once created, the new single URL is displayed to the user through the user interface 208 of the multi-function device 202. When the new single URL is accessed by the user, the URL manager 212 retrieves all scanned documents stored at respective cloud locations and further stores all retrieved documents at the MFD cloud server 216 i.e., at a single cloud location. Here, the URL manager 212 analyzes the new single URL, checks any further URLs embedded in the keywords, if found, opens each specific URL, retrieves documents from there and stores specific documents at a single cloud location i.e., MFD cloud server 216. The retrieved scanned documents can be accessed by the user in a single go without needing him to manually access multiple URLs for accessing multiple documents. Once retrieved, the user can view the scanned documents, print the scanned documents, or store these scanned documents in any device such as USB, hard disk or the like. The scanned documents are stored temporarily at the MFD cloud server 216 and once the user closes the new single URL, the scanned documents are deleted automatically from the cloud server 216. The new single URL can be shared with user via his email or any other users. The URL manager 212 creates the new single URL such that it can be accessed by the user using any device or from anywhere. For example, if the URL manager 212 obtains URLs "https://www.sharepoint.com/user/D1", "https://www.dropbox.com/user/D2", and "https://www-.googledrive.com/user/D3", for the scanned documents D1, D2, and D3, and then it creates a new single URL "https://www.dropdo.com/sales/D1/D2/D3". When the user accesses the new single URL "https://www.dropdo.com/sales/D1/D2/D3", the URL manager 212 first identifies URLs/hyperlinks included in the keyword D1, D2, and D3, accesses the URLs, i.e., "https://www.sharepoint.com/user/D1", "https://www.dropbox.com/user/D2", and "https://www.googledrive.com/user/D3", retrieves respective scanned documents D1, D2 and D3 and stores the scanned document at the single cloud location i.e., Dropdo in this case. The user can access the scanned documents and perform any desired operations such as download, print, email, etc.

The multi-function device 202 is one example but the new single URL can be accessed by the user using any other device such as mobile device, laptop, computing device or the like.

The user interface 208 displays various options to the user such as scan to cloud, all scanned documents and displays other relevant information required for implementing the current disclosure. The user interface 208 further allows the user to provide any input, such as selection of the scanned documents, selection of the scan to cloud option, input cloud location URL and so on., etc.

The memory 214 stores all relevant information required for implementing the current disclosure. For example, the memory 214 may store multiple URLs obtained upon scanning multiple documents to different cloud locations. Any details stored in the memory 214 can be retrieved by the URL manager 212 or other components for implementing the current disclosure.

Exemplary Implementations

Figure 3A:
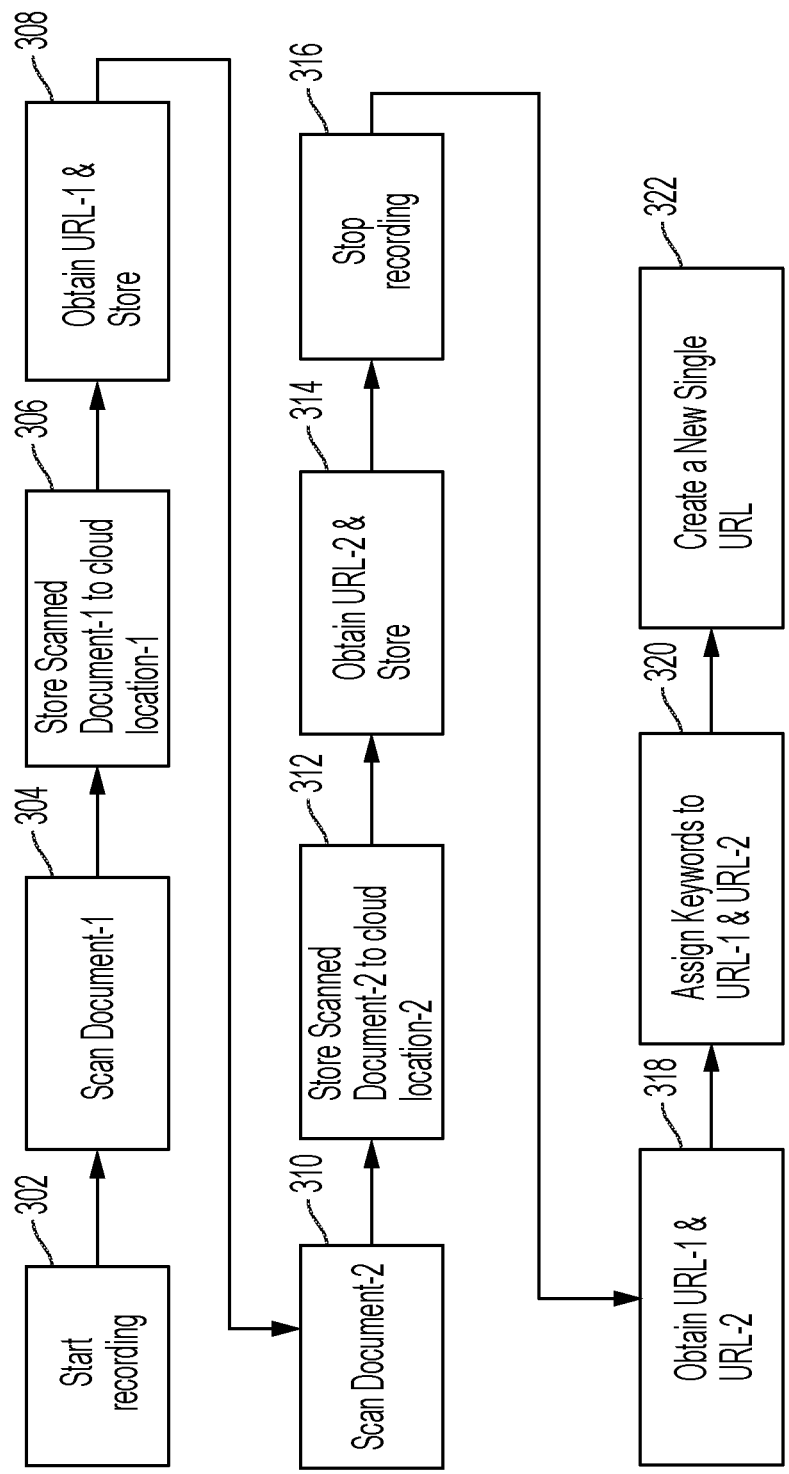
FIGS. 3A, 3B, and 3C show exemplary implementations of the present disclosure.
Figure 3B:
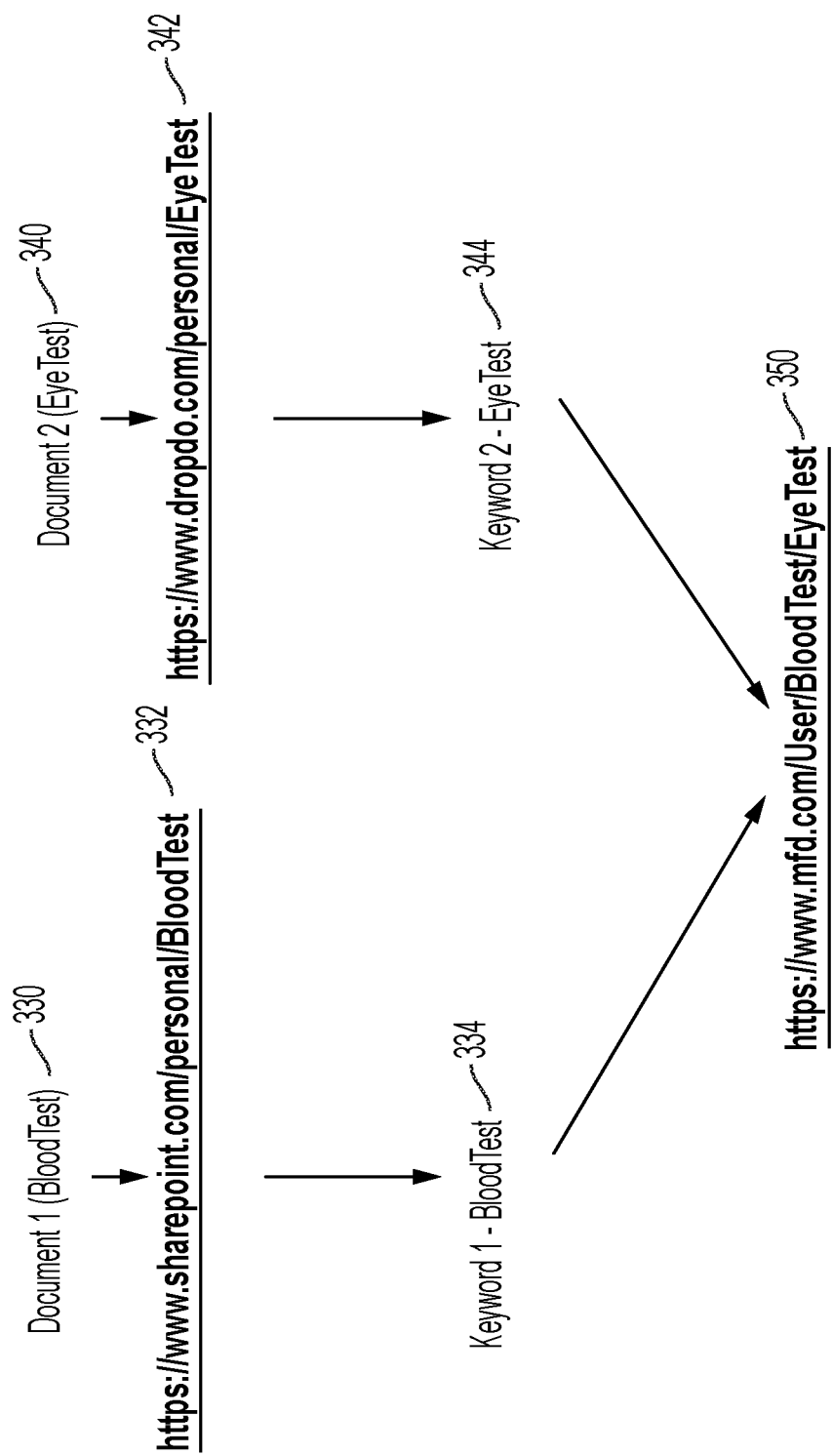

FIG. 3A illustrates a flow diagram for implementing the present disclosure. According to the flow diagram, the user first starts recording (marked as 302) to record the complete session, specific to automatically record URLs. Then, document 1 (such as blood test 330 as shown in FIG. 3B) is scanned at 304, the scanned document 1 is stored at a cloud location 1 at 306, and URL-1 (332 FIG. 3B) is obtained and stored at 308. Similarly, document-2 (such as Eye test 340 shown in FIG. 3B) is scanned at 310, the scanned document 2 is stored at the cloud location-2 at 312, obtains URL-2 (342 of FIG. 3B) and stores the URL-2 at 314 and then recording is stopped at 316. The recording may be trigged by the user or the multi-function device 202 may automatically record the URLs. The URL manager 212 obtains URL-1 (332) and URL-2 (342) at 318, assign keywords to the URL-1 and URL-2 at 320 and creates a new single URL at 322. As clearly shown in FIG. 3B, the keyword such as BloodTest 334 is assigned to the URL-1 (332) and the keyword EyeTest 344 is assigned to the URL-2 (marked as 342) and finally the new single URL such as 350 is created. The new single URL 350 includes the new cloud location and the assigned keywords.

Figure 3C:
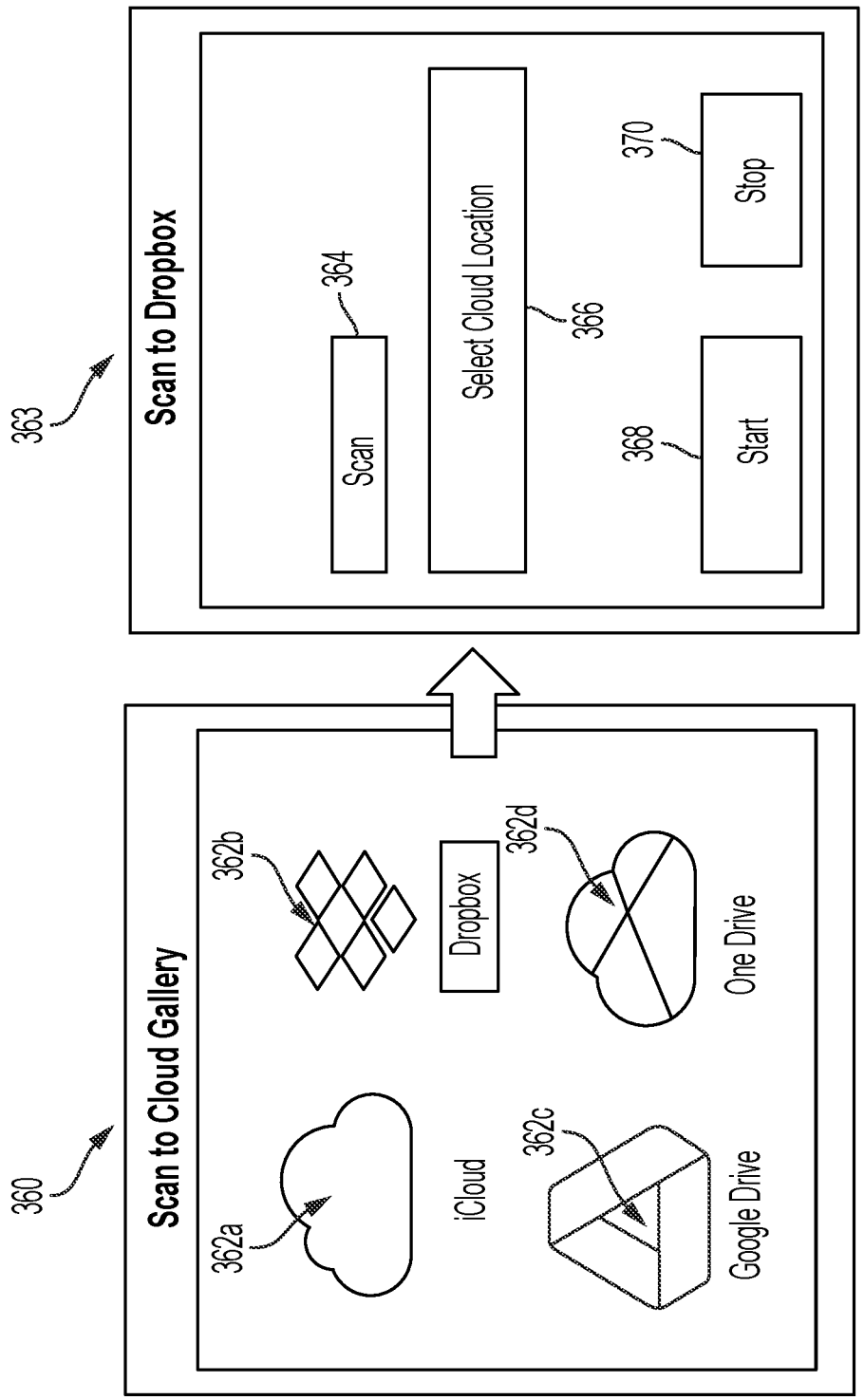

An exemplary user interface 360 is shown in FIG. 3C when the user wishes to scan multiple scanned documents. The user interface 360 is presented to the user with various options such as 362a, 362b, 362c and 362d. The user can select any of the options to store the scanned documents. For example, the user can select icloud option 362a, Dropbox 362b, google drive 362c and one drive 362d. In this example, the user selects the option 362b. Upon selection of the option 362b, another user interface 363 is displayed. The user can further select scan option 364 and scan to cloud location 366 to input specific folder or sub-folder for storing a scanned document. The user interface 363 further includes start option (marked as 368) to start recording URL and stop option (marked as 370) to stop recording the URL for all scanned documents.

Exemplary Flowcharts

Figure 4:
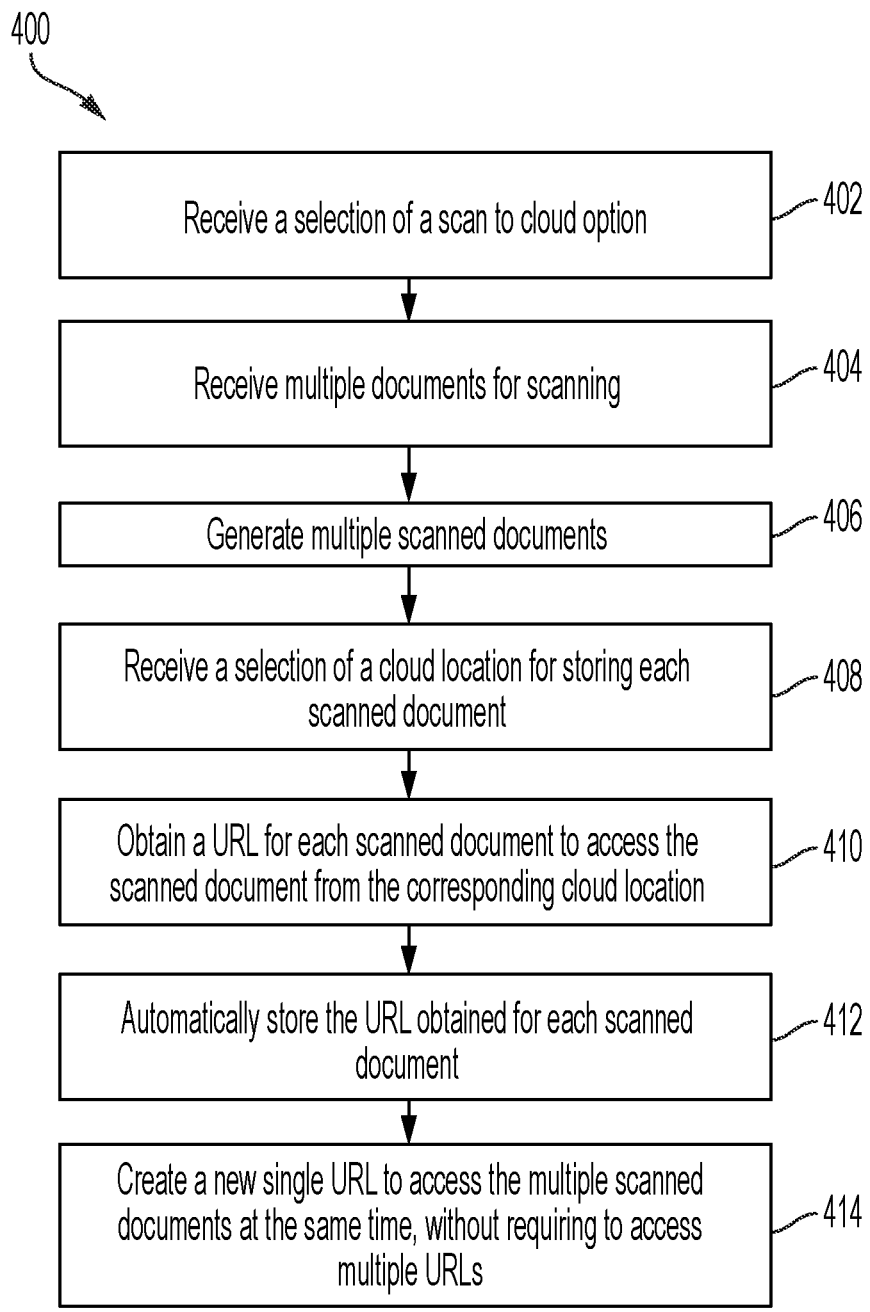
FIG. 4 is an exemplary method flowchart for creating a new single URL, in accordance with an embodiment of the present disclosure.

FIG. 4 is an exemplary method flowchart 400 for handling multiple URLs generated upon scanning multiple documents to one or more cloud locations. The method 400 may be implemented at a multi-function device, such as the multi-function device 102 of FIG. 1, or the multi-function device 202 of FIG. 2. However, the method 400 can be implemented at any equivalent device with scan to cloud functionalities.

The method 400 begins when a user wishes to scan multiple documents to one or more cloud locations. The one or more cloud locations may be different cloud locations. The one or more cloud locations may be the same location but different folders or sub-folders in the cloud location. The user selects a scan to cloud option.

At block 402, a selection of the scan to cloud option is received. The user then submits multiple documents for scanning which are received at 404 for scanning at the multi-function device such as 102.

At block 406, multiple scanned documents are generated. Here, the scanned document is generated corresponding to each document submitted for scanning.

At block 408, a selection of a cloud location for storing each scanned document is received. After scanning each document, selection of a cloud location for storing a scanned document is received and the scanned document is stored in the selected cloud location. For example, if the user wishes to scan two documents to different cloud locations, then the user firstly submits the first document for scanning and selects a desired cloud location for storing the corresponding scanned document. Then, the first document is scanned, and the corresponding scanned document is stored in the user selected cloud location such as One Drive. Thereafter, the user submits the second document for scanning and selects another cloud location for storing the corresponding scanned document. Then, the second document is scanned, and the corresponding scanned document is stored in the user selected cloud location such as Google Drive. The URL for each scanned document is generated by the corresponding cloud server/server provider.

At block 410, a URL for each scanned document to access the scanned document from the corresponding cloud location is obtained. The URLs may be obtained automatically or may be received from the respective cloud service providers.

Once obtained, at block 412, the URL obtained for each scanned document is automatically stored. Then all stored URLs are analyzed to identify a relevant keyword for each scanned document. Once identified, the keyword is assigned to the corresponding URL. The keyword can be derived from the name of the document associated with the URL. For instance, if "https://www.sharepoint.com/user/D1" is the URL for a scanned document, then "D1", may be assigned as the keyword to the URL.

This way, the keywords are assigned to all URLs for all scanned documents. Based on the keywords, at 414, a new single URL is created. The new single includes a new cloud location and keywords assigned to each URLs. Further, each keyword is hyperlinked to the URL.

Once created, the new single URL is presented to the user for further action. For example, the user can share the new single URL with himself and/or one or more other users via email, text message, etc. The user can access the new single URL later. The new single URL when accessed by the user allows the user to access multiple scanned documents at the same time in one go. Here is the user is not required to manually access each URL for multiple scanned documents.

Figure 5:
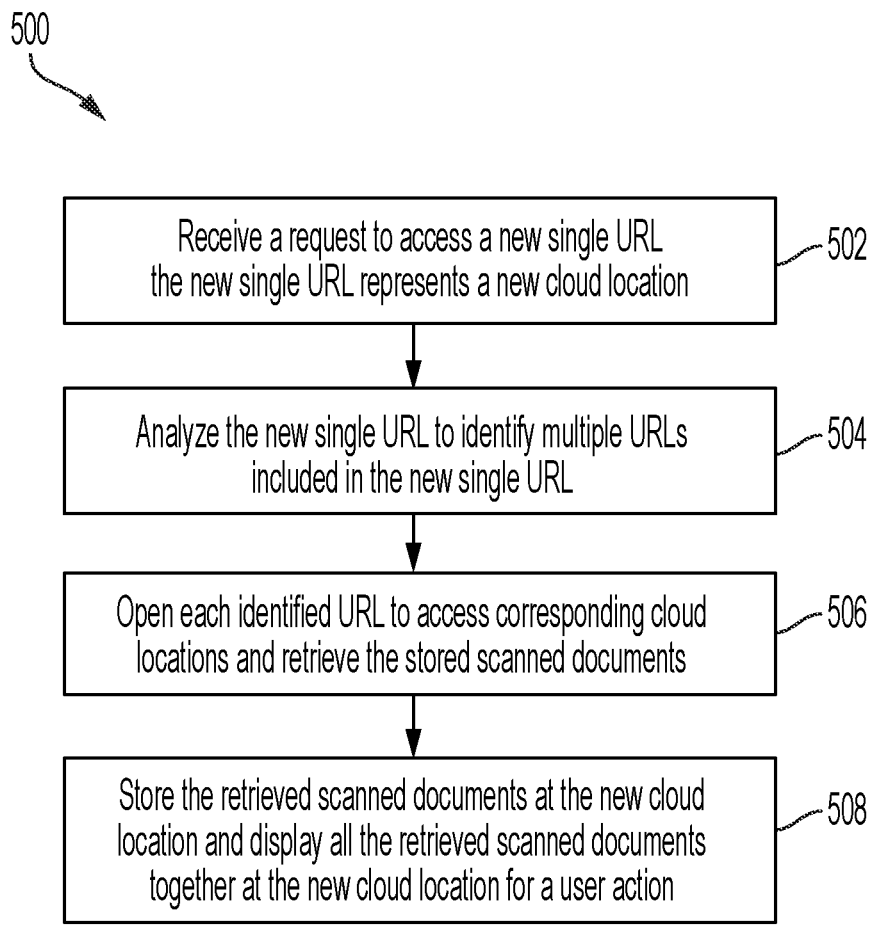
FIG. 5 is an exemplary method flowchart for accessing multiple scanned documents using a new single URL, in accordance with an embodiment of the present disclosure.

FIG. 5 is an exemplary method flowchart 500 for accessing a new single URL. The new single URL can be accessed using any device such as a multi-function device that creates the new single URL or any other devices of the user such as a computing device, a laptop, a smartphone, a mobile device, PDA and so on.

The method 500 begins when the user wishes to access all scanned documents in one go. The user opens the new single URL in any web browser.

When the user accesses the new single URL, at 502, a request to access the new single URL is received. The new single URL represents a new cloud location which can be accessed from anywhere. At 504, the new single URL is analyzed to identify multiple URLs included in the new single URL. Once identified, each identified URL is opened to access corresponding cloud locations and to retrieve the stored scanned documents from the respective cloud locations at 506. Here, the scanned documents are retrieved from multiple cloud locations and stored at the new cloud location. Finally, at 508, the retrieved scanned documents are displayed to the user together at the new cloud location for a user action. For example, the user can view, print, email, and so on.

The methods 400 and 500 may be implemented in the form of non-transitory computer-readable medium storing instructions, which when executed by one or more processors cause the one or more processors to implement the method blocks 402-414 and 502-508, respectively.

Exemplary Case Scenario

Figure 6A:
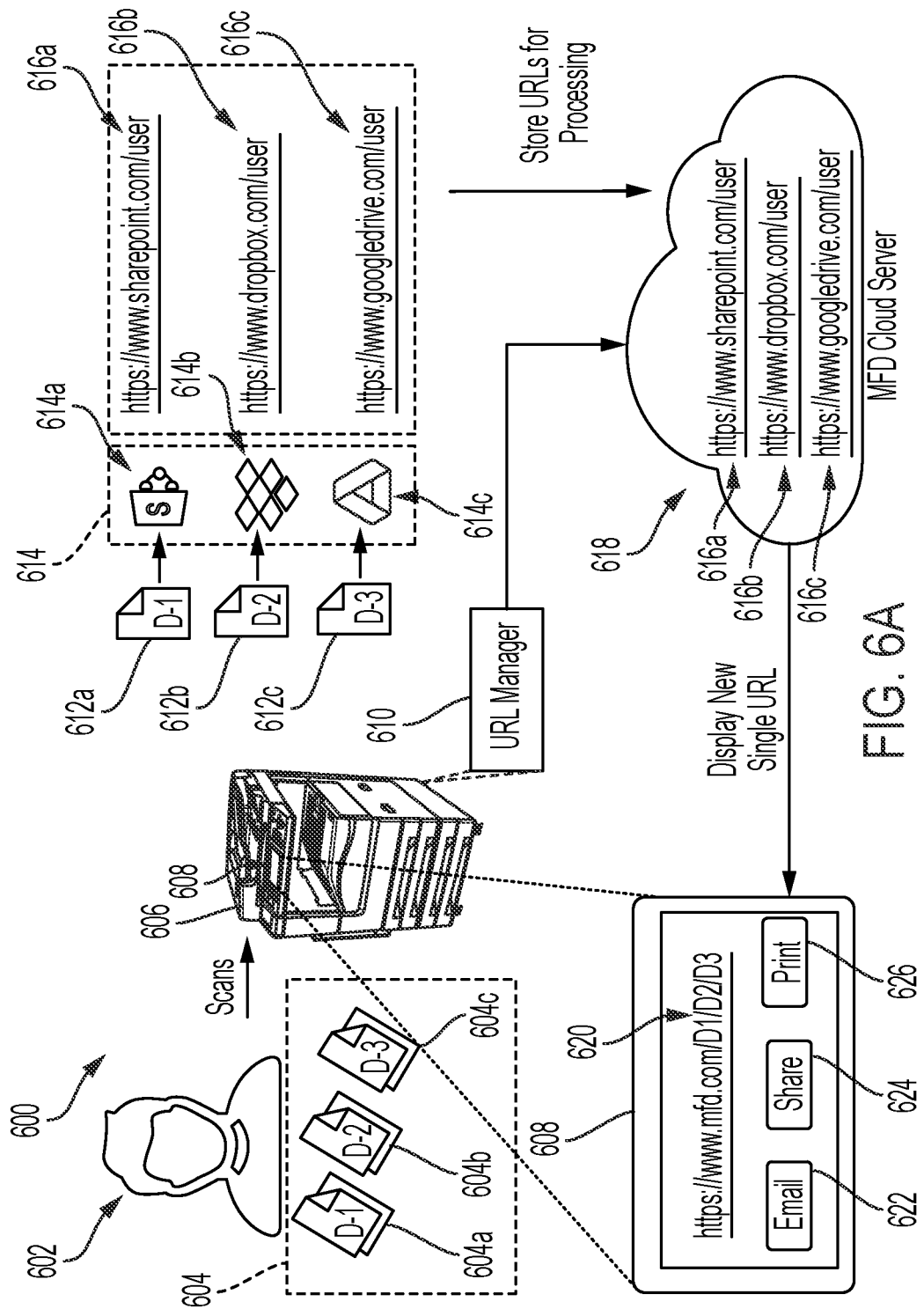
FIGS. 6A and 6B show exemplary case scenarios of the disclosure.
Figure 6B:
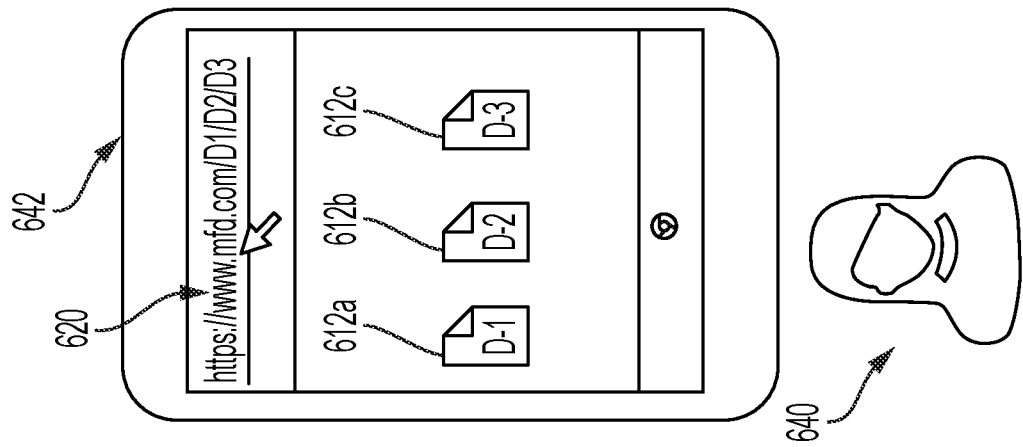
Figure 6B:
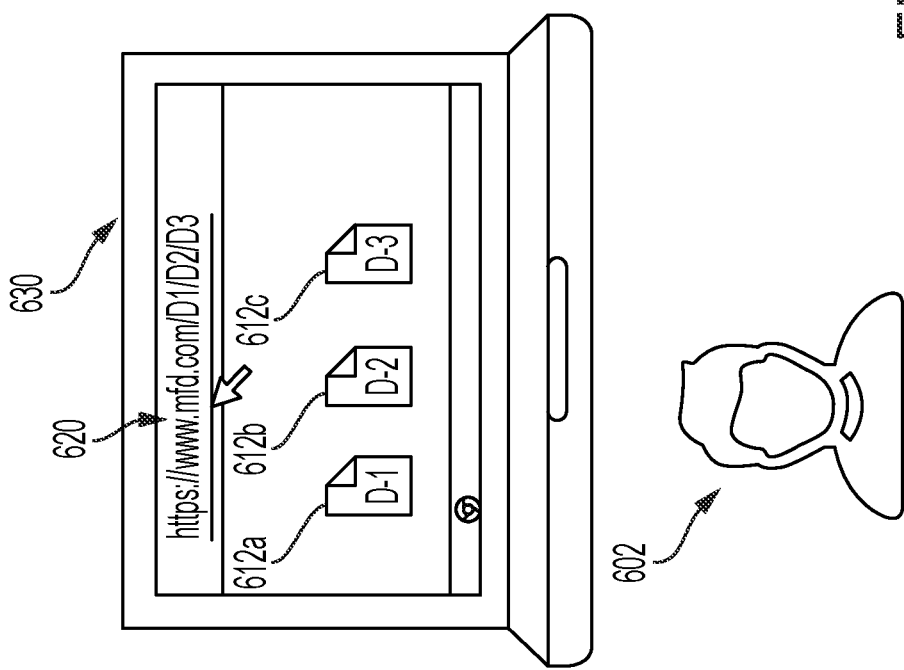

For better clarity, an exemplary use case scenario is discussed in FIGS. 6A-6B. Referring to FIG. 6A, an environment 600 is shown including a user 602, multiple documents 604a, 604b and 604c (collectively 604), a multi-function device 606, an MFD cloud server 618 communicatively coupled to the multi-function device 606, and one or more third-party cloud servers 614a, 614b 614c (collectively 614). The MFD cloud server 618 hosts a cloud storage for storing various data/scanned documents associated with the multi-function device 606. The third-party servers 614 host cloud storage for storing multiple scanned documents received from the multi-function device 606.

In operation, the user 602 submits multiple documents 604a, 604b and 604c (collectively 604) for scanning at the multi-function device 606. The multi-function device 606 further includes a user interface 608 and a URL manager 610. The multi-function device 606 generates scanned documents such as 612a, 612b and 612c (collectively 612) corresponding to the documents 604a, 604b, and 604c respectively submitted for scanning. The scanned documents 612 are stored at various cloud locations 614. As shown, the scanned document 612a is stored at the user selected third-party cloud storage SharePoint™ 614a, the scanned document 612b is stored at the user selected third-party storage such as Dropbox™ 614b and the scanned document 612c is stored at the user selected third-party cloud storage such as 614c GoogleDrive™. The URLs generated for the scanned documents 612a, 612b and 612c are such as 616a, 616b, 616c (collectively 616), respectively. The URL manager 610 obtains the URLs 616a, 616b and 616c and stores in the MFD cloud server 618 for further processing. The URL manager 610 processes all URLS 616a, 616b, and 616c and combines these URLs 616 to create a new single URL such as 620. The new single URL 620 is displayed to the user through the user interface 608 along with various options such as 622, 624 and 626. The option 622 allows the user 602 to email the new single URL 620, the option 624 allows the user 602 to share the new single URL 620 with other user such as 640 (FIG. 6B) or the option 626 allows the user 602 to print the new single URL 620. The new single URL 620 can be accessed by the user 602 at later hour using any computing device such as 630 as shown in FIG. 6B. When the user 602 accesses the new single URL 620, all scanned document such as 612a, 612b and 612c are retrieved from the respective cloud locations and are shown to the user together at the same time. Similarly, the new single URL 620 can be accessed by another device such as mobile device 642. When the user 640 accesses the new single URL 620, all scanned documents 612a, 612b and 612c are retrieved and displayed to the user 640 at the same time in a single go.

The methods and systems can be implemented in the form of a scan to cloud application. The scan to cloud application can run on any device such as a multi-function device, a mobile device, a computing device or the like. The scan to cloud application receives multiple URLs for multiple scanned documents, processes these multiple URLs and created a new single URL. The new single URL is created such that multiple scanned documents stored over various cloud locations can be easily accessed by a user through a single URL.

The present disclosure discloses methods and systems for managing multiple URLs obtained upon scanning multiple documents to one or more cloud locations. The methods and systems manage multiple URLs such that a new single URL is created that allows the user to access all scanned documents at the same time without requiring the user to manually access multiple URLs. The new single URL can be shared with other users. The methods and systems provide a user friendly, easy and convenient approach to access multiple scanned documents in a single go and enhances the overall user experience.

Although the disclosure is discussed with respect to a multi-function device, but the disclosure can be implemented at a mobile device in form of an application such as scan to cloud application. The mobile device includes a camera and the application to implement the present disclosure. Initially, the user launches the application on his device and selects an option scan to cloud. Then, the user scans multiple documents using a camera of the mobile device. Here, the user scans one document at a time and selects a desired cloud location for storing the scanned document. The scanned document is then sent to corresponding cloud server, say cloud server 1 for storing the scanned document, the cloud server generates a first URL corresponding to the scanned document. The mobile application obtains the first URL generated from the cloud server 1. Here, the user scans a second document and selects a desired cloud location for storing the scanned document. The scanned document is then sent to corresponding cloud server, say cloud server 2 for storing the scanned document, the cloud server 2 generates a second URL corresponding to the scanned document. The mobile application obtains the second URL generated by the cloud server 2. The process of scanning and obtaining URL is repeated until all documents are scanned. Upon successful completion of scanning of all the documents, the mobile application process all obtained URLs to create a new single URL. The new single URL is created such that all scanned documents can be accessed in one go. Further, the scanned documents can be accessed at the same time without requiring the user to manually access the scanned documents.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, storing, accessing, printing, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for handling multiple URLs (Uniform Resource Locators) generated upon scanning multiple documents to one or more cloud locations, the method comprising:
   receiving a selection of a scan to cloud option, wherein the scan to cloud option is selected by a user via a user interface;
   receiving multiple documents for scanning;
   generating multiple scanned documents, wherein each scanned document is generated corresponding to a document input for scanning;
   receiving a selection of a cloud location for storing each scanned document;
   obtaining a URL for each scanned document, wherein the URL allows the user to access the scanned document from the corresponding cloud location;
   automatically storing the URL obtained for each scanned document;
   identifying a keyword for each URL obtained for each scanned document; and
   based on the identified keyword for each URL, creating a new single URL to access the multiple scanned documents at the same time, without requiring the user to access multiple URLs, wherein the new single URL represents a new cloud location.

2. The method of claim 1, wherein the new single URL when accessed by the user allows the user to access the multiple scanned documents stored at the one or more cloud locations in a single request.

3. The method of claim 1, wherein accessing the new single URL by the user comprises automatically retrieving each scanned document from the corresponding cloud location to the new cloud location.

4. The method of claim 1, wherein the new single URL comprises multiple URLs obtained for each scanned document.

5. The method of claim 1, further comprising, automatically deleting the stored scanned documents when the user closes the new single URL.

6. The method of claim 1, further comprising, analyzing each URL to identify the keyword associated with each URL obtained for each scanned document.

7. The method of claim 1, wherein the new single URL comprises the new cloud location and the keyword identified for each URL as obtained.

8. The method of claim 1, is implemented by at least: a multi-function device, a scanner and a mobile device.

9. A multi-function device comprising:
   a user interface for:
      receiving a selection of a scan to cloud option;
      receiving a selection of a cloud location for storing each scanned document;
   an automatic document handler (ADH) for receiving multiple documents for scanning;
   a scanner for generating scanned documents, wherein each scanned document is generated corresponding to a document input for scanning; and
   a Uniform Resource Locator (URL) manager for:
      obtaining a URL for each scanned document, wherein the URL allows the user to access the scanned document from the corresponding cloud location;
      automatically storing the URL obtained for each scanned document;
      identifying a keyword for each URL obtained for each scanned document; and
      based on the identified keyword for each URL, creating a new single URL to access the multiple scanned documents together at a single location, without requiring the user to manually accessing multiple URLs, wherein the new single URL represents a new cloud location.

10. The multi-function device of claim 9, wherein the new single URL when accessed by the user allows the user to access the multiple scanned documents stored at the one or more cloud locations in a single go.

11. The multi-function device of claim 9, wherein accessing the new single URL comprises automatically retrieving each scanned document from the corresponding cloud location to the new cloud location.

12. The multi-function device of claim 9, wherein the new single URL comprises multiple URLs as originally obtained for each scanned document.

13. The multi-function device of claim 9, wherein the URL manager analyzes each URL to identify the keyword associated with each URL obtained for each scanned document.

14. The multi-function device of claim 9, wherein the new single URL comprises the new cloud location and the keyword identified for each URL as obtained.

15. A non-transitory computer-readable medium storing instructions, which when executed by one or more processors cause the one or more processors to:
   receiving multiple URLs (Uniform Resource Locators) obtained for multiple scanned documents stored at one or more different cloud locations, wherein each URL corresponds to a scanned document;
   identifying a keyword for each URL obtained for each scanned document; and
   based on the identified keyword for each URL, generating a new single URL to access multiple scanned documents placed at the one or more different cloud locations, without requiring the user to access multiple URLs to access multiple scanned documents, wherein the new single URL represents a new cloud location.

16. The non-transitory computer-readable medium_of claim 15, wherein the new single URL when accessed by the user allows the user to access the multiple scanned documents stored at the one or more different cloud locations in a single go.

17. The non-transitory computer-readable medium of claim 15, wherein accessing the new single URL comprises automatically retrieving each scanned document from the corresponding cloud location to the new cloud location.

18. The non-transitory computer-readable medium of claim 15, further comprising, automatically deleting the stored scanned documents when the user closes the new single URL.

* * * * *